US009519971B2

(12) United States Patent
Kotake et al.

(10) Patent No.: US 9,519,971 B2
(45) Date of Patent: Dec. 13, 2016

(54) POSITION AND ORIENTATION MEASUREMENT DEVICE AND POSITION AND ORIENTATION MEASUREMENT METHOD

(75) Inventors: Daisuke Kotake, Yokohama (JP); Keisuke Tateno, Kawasaki (JP); Shinji Uchiyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 466 days.

(21) Appl. No.: 13/323,504

(22) Filed: Dec. 12, 2011

(65) Prior Publication Data
US 2012/0148100 A1    Jun. 14, 2012

(30) Foreign Application Priority Data
Dec. 14, 2010 (JP) ................................. 2010-278270

(51) Int. Cl.
*G06K 9/00* (2006.01)
*G06T 7/00* (2006.01)

(52) U.S. Cl.
CPC ... *G06T 7/0046* (2013.01); *G06T 2207/10004* (2013.01); *G06T 2207/10028* (2013.01)

(58) Field of Classification Search
CPC .................................................. G06T 7/0046
USPC ................................. 382/103, 154
See application file for complete search history.

(56) References Cited

U.S. PATENT DOCUMENTS

| 5,612,905 | A * | 3/1997 | Maillart et al. | ................ 702/153 |
| 6,438,272 | B1 * | 8/2002 | Huang et al. | ................. 382/286 |
| 6,724,930 | B1 * | 4/2004 | Kosaka | ................ G01B 11/002 382/154 |

(Continued)

FOREIGN PATENT DOCUMENTS

| EP | 2169627 A2 * | 3/2010 |
| EP | 2466543 A2 * | 6/2012 |

(Continued)

OTHER PUBLICATIONS

T. Drummond and R. Cipolla, "Real-time visual tracking of complex structures," IEEE Transactions on Pattern Analysis and Machine Intelligence, vol. 24, No. 7, pp. 932-946, 2002.

(Continued)

*Primary Examiner* — Gandhi Thirugnanam
(74) *Attorney, Agent, or Firm* — Canon USA, Inc. IP Division

(57) ABSTRACT

A position and orientation measurement device includes a grayscale image input unit that inputs a grayscale image of an object, a distance image input unit that inputs a distance image of the object, an approximate position and orientation input unit that inputs an approximate position and orientation of the object with respect to the position and orientation measurement device, and a position and orientation calculator that updates the approximate position and orientation. The position and orientation calculator calculates a first position and orientation so that an object image on an image plane and a projection image of the three-dimensional shape model overlap each other, associates the three-dimensional shape model with the image features of the grayscale image and the distance image, and calculates a second position and orientation on the basis of a result of the association.

12 Claims, 6 Drawing Sheets

(56) References Cited

U.S. PATENT DOCUMENTS

| | | | |
|---|---|---|---|
| 7,218,773 B2 * | 5/2007 | Ishiyama | G06K 9/00234 382/154 |
| 7,414,732 B2 * | 8/2008 | Maidhof et al. | 356/601 |
| 7,684,052 B2 * | 3/2010 | Suwa et al. | 356/601 |
| 9,025,857 B2 * | 5/2015 | Kotake | G01B 11/25 382/106 |
| 2003/0035098 A1 * | 2/2003 | Ishiyama | 356/72 |
| 2004/0022432 A1 * | 2/2004 | Hayata et al. | 382/159 |
| 2005/0099637 A1 * | 5/2005 | Kacyra et al. | 356/601 |
| 2005/0151839 A1 * | 7/2005 | Ito et al. | 348/51 |
| 2006/0165293 A1 * | 7/2006 | Hamanaka | 382/209 |
| 2009/0033655 A1 * | 2/2009 | Boca et al. | 345/419 |
| 2009/0074238 A1 * | 3/2009 | Pfister | G06T 7/0046 382/100 |
| 2010/0073366 A1 * | 3/2010 | Tateno | G06T 17/20 345/419 |
| 2010/0245355 A1 * | 9/2010 | Chang | G06T 7/0044 345/426 |
| 2010/0328682 A1 * | 12/2010 | Kotake et al. | 356/620 |
| 2011/0164114 A1 * | 7/2011 | Kobayashi et al. | 348/46 |
| 2011/0206274 A1 * | 8/2011 | Tateno et al. | 382/154 |
| 2011/0282189 A1 * | 11/2011 | Graumann | 600/427 |
| 2012/0121135 A1 * | 5/2012 | Kotake | G01S 5/163 382/103 |
| 2012/0148100 A1 * | 6/2012 | Kotake et al. | 382/103 |
| 2013/0010070 A1 * | 1/2013 | Tateno et al. | 348/46 |
| 2013/0011018 A1 * | 1/2013 | Tateno et al. | 382/106 |
| 2013/0076865 A1 * | 3/2013 | Tateno et al. | 348/46 |
| 2013/0121592 A1 * | 5/2013 | Fujiki et al. | 382/195 |
| 2013/0230235 A1 * | 9/2013 | Tateno et al. | 382/154 |
| 2013/0238295 A1 * | 9/2013 | Hyung | G06T 7/0046 703/2 |

FOREIGN PATENT DOCUMENTS

| | | | |
|---|---|---|---|
| EP | 2416113 A2 * | 8/2012 | |
| EP | 2543482 A1 * | 1/2013 | |
| EP | 2639766 A2 * | 9/2013 | |
| JP | 2003-058896 A | 2/2003 | |
| JP | 2007-271554 A | 10/2007 | |
| JP | 2010-060451 A | 3/2010 | |
| WO | WO 2011158885 A1 * | 12/2011 | |

OTHER PUBLICATIONS

D. A. Simon, M. Hebert, and T. Kanade, "Real-time 3-D pose estimation using a high-speed range sensor," Proc. 1994 IEEE International Conference on Robotics and Automation (ICRA'94), pp. 2235-2241, 1994.

Kosuke Sato et al.; Range Picture Input System Based on Space-Encoding; Faculty of Engineering Science, Osaka University, Toyonaka-shi, 560 Japan, pp. 369-375.

Zhengyou Zhang; A Flexible New Technique for Camera Calibration; IEEE Transactions on Pattern Analysis and Machine Intelligence, vol. 22, No. 11, Nov. 2000, pp. 1330-1334.

Takeshi Oishi et al.; Fast Simultaneous Alignment of Multiple Range Images Using Index Images; Interfaculty Initiative in Information Studies, The University of Tokyo, Tokyo, 113-0033, Japan, pp. 513-521.

Kanaya; Shape CAD and Geometry Mathematics; Kyoritsu Shuppan, pp. 34-37.

Yuncai Liu et al.; Determination of Camera Location From 2-D to 3-D Line and Point Correspondences; Coordinated Science Laboratory, University of Illinois at Urban-Champaign; CVPR 1988, pp. 82-88.

Andrew E. Johnson et al.; Using Spin Images for Efficient Object Recognition in Cluttered 3D Scenes; IEEE Transactions on Pattern Analysis and Machine Intelligence, vol. 21, No. 5, May 1999, pp .433-449.

Chris Harris et al., A Combined Corner and Edge Detector; Proc. the 4th Alvey Vision Conference, 1988, pp. 147-151.

* cited by examiner

FIG. 2A
FIG. 2B
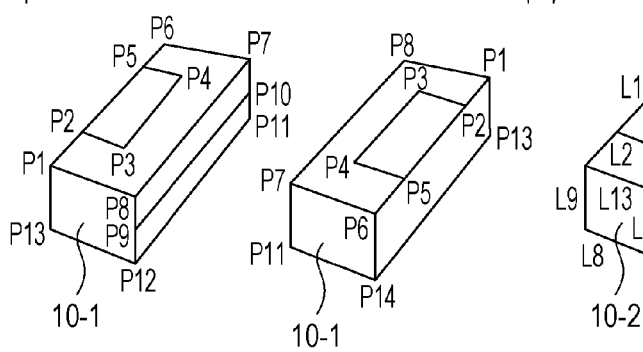
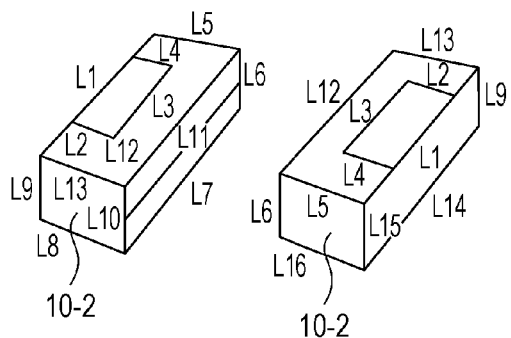
FIG. 2C
| POINT | X | Y | Z |
|---|---|---|---|
| P1 | 200 | 200 | 0 |
| P2 | 200 | 200 | 150 |
| P3 | 100 | 200 | 150 |
| P4 | 100 | 200 | 350 |
| P5 | 200 | 200 | 350 |
| P6 | 200 | 200 | 500 |
| P7 | 0 | 200 | 500 |
| P8 | 0 | 200 | 0 |
| P9 | 0 | 100 | 0 |
| P10 | 0 | 100 | 500 |
| P11 | 0 | 0 | 500 |
| P12 | 0 | 0 | 0 |
| P13 | 200 | 0 | 0 |
| P14 | 200 | 0 | 500 |
FIG. 2D
| LINE | TWO POINTS AT BOTH ENDS |
|---|---|
| L1 | P1-P6 |
| L2 | P2-P3 |
| L3 | P3-P4 |
| L4 | P4-P5 |
| L5 | P6-P7 |
| L6 | P7-P11 |
| L7 | P11-P12 |
| L8 | P12-P13 |
| L9 | P1-P13 |
| L10 | P8-P12 |
| L11 | P9-P10 |
| L12 | P7-P8 |
| L13 | P1-P8 |
| L14 | P13-P14 |
| L15 | P6-P14 |
| L16 | P11-P14 |

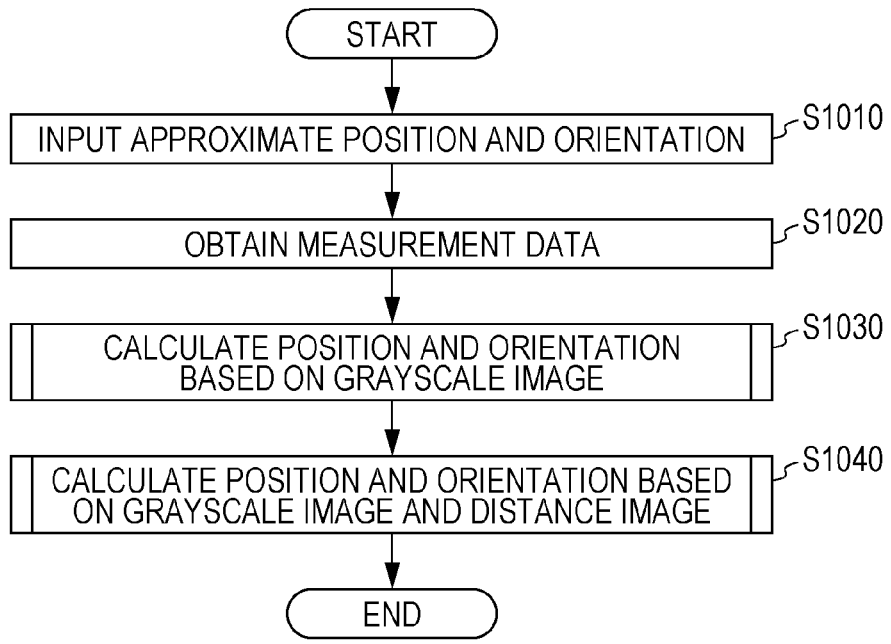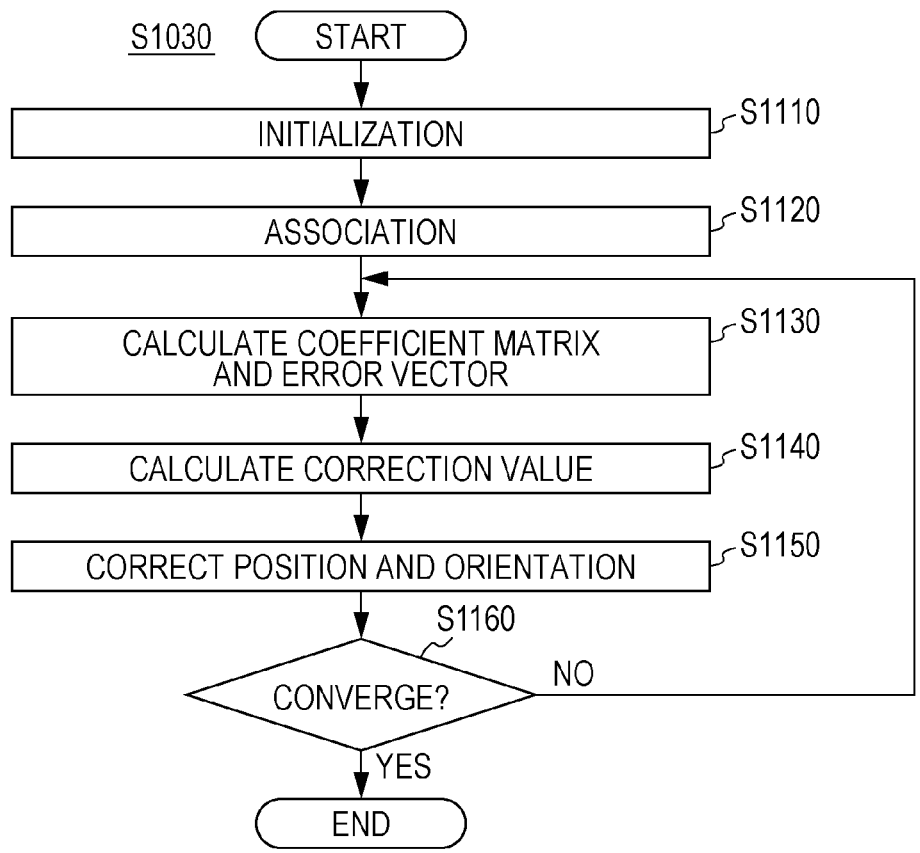

POSITION AND ORIENTATION MEASUREMENT DEVICE AND POSITION AND ORIENTATION MEASUREMENT METHOD

BACKGROUND OF THE INVENTION

1. Field of the Invention

The present invention relates to a position and orientation measurement device and a position and orientation measurement method for measuring a position and orientation of an object to be measured.

2. Description of the Related Art

In recent years, as robot technology develops, robots are beginning to perform complex tasks, such as an assembly of industrial products, which have been performed by human beings. An arm type robot is mainly used to perform such tasks, and the robot grips a part by an end effector such as a hand attached to the tip of the arm and performs an assembly. It is necessary to accurately measure relative position and orientation between the part and the robot (end effector) for the robot to appropriately grip the part. When a robotic assembly is applied to an actual assembly operation, the measurement of position and orientation of a part needs to be quick and accurate. Such a position and orientation measurement technique is required in various fields such as self-position estimation for a robot to move autonomously and creation of three-dimensional model data from actual measurement data in addition to assembly of industrial products by a robot.

To measure position and orientation of a part in a manufacturing site of industrial products, a grayscale (color) image obtained from a camera and a distance image obtained from a noncontact distance sensor are mainly used. Measurement of position and orientation for each object is generally performed by fitting a three-dimensional shape model of the object to measurement data (grayscale image or distance image). In T. Drummond and R. Cipolla, "Real-time visual tracking of complex structures," IEEE Transactions on Pattern Analysis and Machine Intelligence, vol. 24, no. 7, pp. 932-946, 2002 (hereinafter referred to as Non-Patent Document 1), a method is disclosed in which a three-dimensional shape model of an object is represented by a wireframe model that is a set of line segments and a projection image of the line segments is fitted to edges on a grayscale image, so that the position and orientation of the object is measured. In the method using the edges on the grayscale image, the position and orientation of the object is measured so that "a distance on a two-dimensional image plane" between a projection image of a portion to be an edge on the image such as a contour portion of the object and a boundary of surfaces and an edge on the image becomes minimum. Therefore, a measurement accuracy of a component of the position and orientation, which largely changes the distance on the two-dimensional image plane, is high. However, the measurement accuracy of components other than the above component is not necessarily high. Specifically, the measurement accuracy of a position component in a direction perpendicular to the optical axis of the camera and an orientation component around the optical axis is high. On the other hand, the measurement accuracy of a position component (depth) in a direction of the optical axis of the camera is low.

In D. A. Simon, M. Hebert, and T. Kanade, "Real-time 3-D pose estimation using a high-speed range sensor," Proc. 1994 IEEE International Conference on Robotics and Automation (ICRA'94), pp. 2235-2241, 1994 (hereinafter referred to as Non-Patent Document 2), a method is disclosed in which a three-dimensional shape model (polygon model) of an object is fitted to a three-dimensional point group data on the surface of the object which is obtained from a distance image, so that the position and orientation of the object is measured. The method that uses a distance image as disclosed in Non-Patent Document 2 is a method for directly minimizing a distance "in a three-dimensional space" between the point group and the model, so that the measurement accuracy of the position and orientation is basically high. However, in an active stereo method disclosed in Satoh, Iguchi, "Distance image input by space code" Journal of Electronics, Information and Communication, vol. J68-D, no. 3, pp. 369-375, 1985, a distance of the contour portion of the object may not be able to be measured stably, so that the position and orientation at which the contour portion correctly corresponds cannot be measured depending on the shape and the observation direction of the object.

In view of the characteristics of the method using a grayscale image and the method using a distance image described above, it can be said that there is a complementary relationship between information obtained from the grayscale image and information obtained from the distance image in the estimation of the position and orientation. Therefore, the position and orientation is measured so that the three-dimensional shape model fits to both the grayscale image and the distance image, and thereby the measurement accuracy of the position and orientation can be improved. In the methods described below which are disclosed in Non-Patent Document 1 and Non-Patent Document 2, the sum of squares of errors between the model projection image and edges on a two-dimensional image plane and the sum of squares of errors between the model and the point group in a three-dimensional space are minimized respectively as an evaluation function. The scale of the distance on the two-dimensional image plane is different from that of the error in the three-dimensional space, so that, in a simple method that estimates the position and orientation so that the sum of the two evaluation functions becomes minimum, there is a problem that influence of one of the two evaluation functions becomes large. Conventionally, a measurement method of the position and orientation is proposed in which information of the grayscale image and information of the distance image are complementarily used by collectively evaluating errors of different scales by using a common scale. Here, as one of common scales, errors in the two-dimensional image plane and errors in the three-dimensional space are respectively represented by probabilities of occurrence (likelihoods) in probability distributions of these errors, and a highly accurate measurement of the position and orientation is performed by maximizing the product of the likelihoods.

There is a strict restriction of time in a manufacturing process of industrial products, so that a measurement of a position and orientation of a part, which is a part of the manufacturing process, needs to be performed as fast as possible. There are many other cases, in which the measurement of a position and orientation needs to be performed quickly, such as self-position estimation of a robot. The estimation of the position and orientation by fitting the three-dimensional shape model to the grayscale image and the distance image includes two steps of (1) associating the model with the image and (2) calculating the position and orientation based on a result of the association. To estimate a highly accurate position and orientation, these steps are generally repeated a plurality of times. In the two steps described above, the calculation time taken to associate the model with the image often becomes a problem.

In the method disclosed in Non-Patent Document 1 described above, line segments in the three-dimensional shape model are projected onto the image on the basis of an initial value of the position and orientation, and corresponding edges are searched near the projected images on the image, so that the association process of the model with the image is speeded up. On the other hand, when associating the distance image with the three-dimensional shape model, it is necessary to search for a nearest point in the three-dimensional space.

In the Non-Patent Document 2 described above, the nearest point is searched by using a kd-tree. However, in this method, a calculation in which the order is O(N log M) is required (N is the number of points in data, M is the number of points in the model), so that it takes time to use data having a large number of measurement points, such as the distance image in which each pixel becomes a measurement point.

On the other hand, conventionally, in the same manner as the method of Non-Patent Document 1 described above, a method in which the model is projected onto the image to speed up the association is proposed. Specifically, a calculation for projecting a geometric feature in the three-dimensional shape model onto the image is performed on the basis of an initial value of the position and orientation, and the position of the geometric feature on the image is calculated. Next, the geometric feature is associated with a pixel in the distance image on the basis of the position of the geometric feature on the image, so that a quick association is realized.

However, to associate the image with the three-dimensional shape model on the basis of the projection of the three-dimensional shape model onto the image, it is required that the projection image of the three-dimensional shape model and the image of the actual object sufficiently overlap each other. Therefore, if a shift between the initial value of the position and orientation used for projection and the actual position and orientation is large, a large number of association errors occur and the calculation of the position and orientation in a later process fails. When associating edges in the grayscale image, explicit features (edges) are used, so that the association is relatively robust against a shift of initial value.

On the other hand, when associating the distance image, explicit features such as edges in the grayscale image are not used, so that the association is not so robust against a shift of initial value and the calculation of the position and orientation may fail. Conversely, if the shift of initial value is small and the distance image can be correctly associated with the model, it is possible to measure the position and orientation at a high degree of accuracy by using the distance image. As described above, the robust property against the shift of initial value is different between the grayscale image and the distance image. In other words, conventionally, the characteristics described above are not considered, and the robust property against the shift of initial value can be further improved by selectively using measurement data with good characteristics step-by-step.

SUMMARY OF THE INVENTION

The present invention has been made in consideration of the above situation, and has as its object to reduce the number of association errors between the image and the three-dimensional shape model and realize a quick and robust measurement of the position and orientation of the object by using measurement data having good characteristics according to a level of shift of the initial value.

According to the present invention, the foregoing object is attained by providing a position and orientation measurement device that measures a position and orientation of an object to be measured. The position and orientation measurement device includes a storage unit that stores a three-dimensional shape model of the object, a grayscale image inputs unit that input a grayscale image of the object, a distance image inputs unit that input a distance image of the object, an approximate position and orientation input unit that inputs an approximate position and orientation of the object with respect to the position and orientation measurement device, and a position and orientation calculator that updates the approximate position and orientation so that the three-dimensional shape model fits to image features of the grayscale image and the distance image. The position and orientation calculator calculates a first position and orientation so that an object image on an image plane and a projection image of the three-dimensional shape model overlap each other by using at least information of the grayscale image, associates the three-dimensional shape model with the image features of the grayscale image and the distance image on the basis of the projection image of the three-dimensional shape model projected onto the image plane by using the first position and orientation, and calculates a second position and orientation on the basis of a result of the association.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A to 2D are schematic diagrams for explaining a three-dimensional shape model of the first embodiment of the present invention.

FIG. 3 is a flowchart showing an example of a procedure of a position and orientation measurement process performed by the position and orientation measurement device according to the first embodiment of the present invention.

FIG. 4 is a flowchart showing an example of a procedure of a position and orientation measurement (position and orientation calculation) in step S1030 in FIG. 3.

DESCRIPTION OF THE EMBODIMENTS

Embodiments of the present invention will be described in detail in accordance with the accompanying drawings.

First Embodiment

In a first embodiment, first, the position and orientation of an object is estimated by using information of a grayscale image, and then the position and orientation is estimated so that a model is fitted to a feature of the grayscale image and a distance image at the same time.

In the present embodiment, an initial value of the position and orientation is given in advance. When a difference between the actual position and orientation and the initial value is large, an association error occurs frequently when associating a distance image (three-dimensional point group) with a three-dimensional shape model by projecting a model. In the first embodiment, before associating the distance image, an overlap area between a projection image of the model and an actual object image is enlarged as much as possible by estimating the position and orientation using a feature of the image, so that the number of association errors is reduced when associating the distance image.

Figure 1:
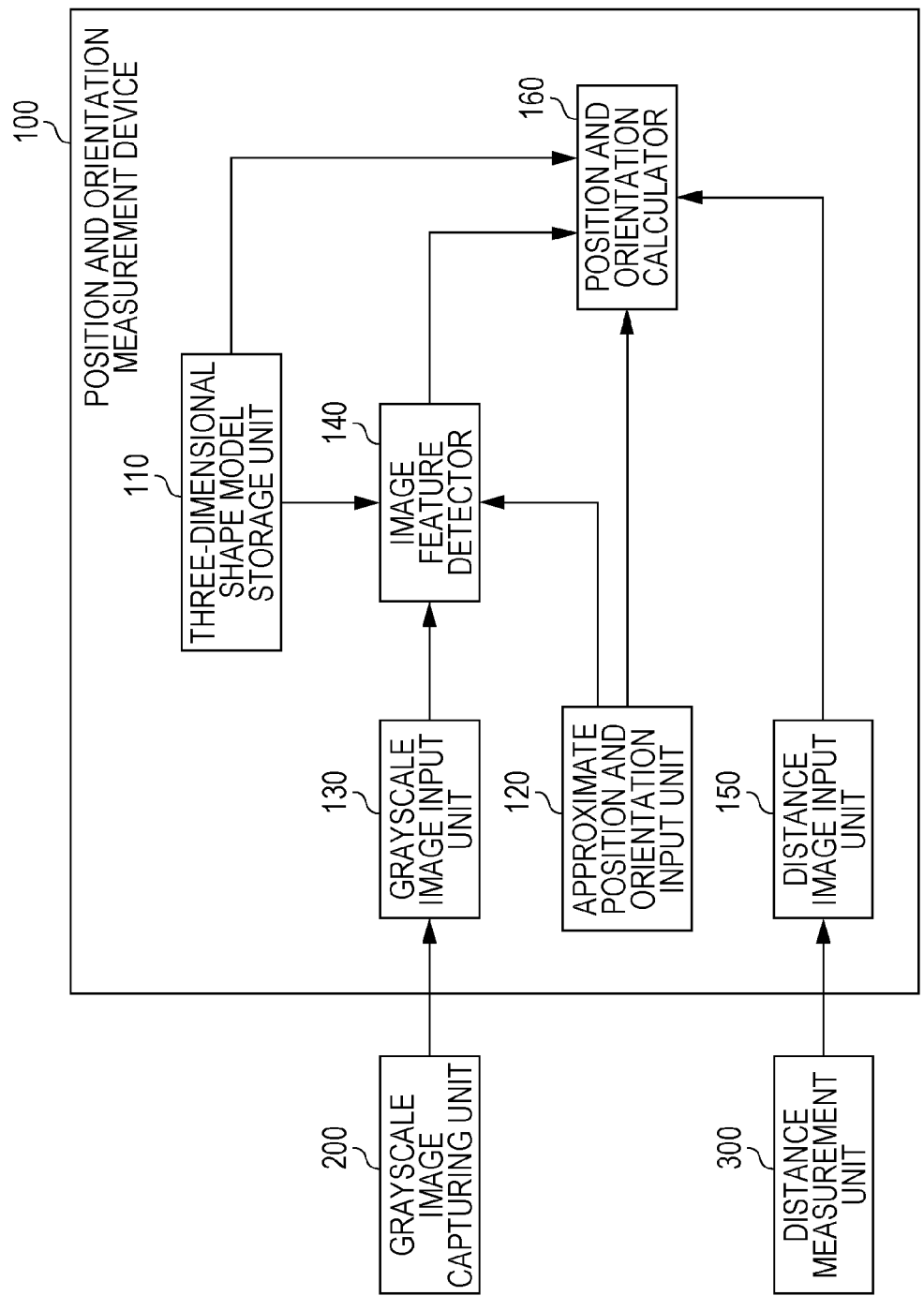
FIG. 1 is a block diagram showing an example of a schematic configuration of a position and orientation measurement system including a position and orientation measurement device according to a first embodiment of the present invention.

FIG. 1 is a block diagram showing an example of a schematic configuration of a position and orientation measurement system including a position and orientation measurement device according to a first embodiment of the present invention.

As shown in FIG. 1, the position and orientation measurement system includes a position and orientation measurement device 100, a gray scale image capturing unit 200, and a distance measurement unit 300.

As shown in FIG. 1, the position and orientation measurement device 100 includes a three-dimensional shape model storage unit 110, an approximate position and orientation input unit 120, a grayscale image input unit 130, an image feature detector 140, a distance image input unit 150, and a position and orientation calculator 160. The gray scale image capturing unit 200 and the distance measurement unit 300 are connected to the position and orientation measurement device 100.

The gray scale image capturing unit 200 is a camera that captures a normal grayscale image. An image captured by the gray scale image capturing unit 200 may be a grayscale image or a color image. The image captured by the gray scale image capturing unit 200 is inputted into the position and orientation measurement device 100 via the grayscale image input unit 130. Internal parameters such as a focal length and a principal point of the camera and a lens distortion parameter are calibrated in advance by a method described in Z. Zhang, "A flexible new technique for camera calibration", IEEE Transactions on Pattern Analysis and Machine Intelligence, Vol. 22, No. 11, pages 1330-1334, 2000.

The distance measurement unit 300 measures a distance to a point on a surface of an object to be measured. In the present embodiment, a distance sensor that outputs a distance image is used as the distance measurement unit 300. The distance image is an image in which each pixel has information of a distance from the distance measurement unit 300. In the present embodiment, each pixel does not store information of a distance, but stores three-dimensional coordinates, which are calculated on the basis of the distance, in a coordinate system based on the measurement device. In other words, three-dimensional point group data can be obtained from the distance image. The distance values are converted into the three-dimensional point group by multiplying an eye vector corresponding to each pixel position by the distance values. As the distance sensor, an active type distance sensor is used in which an image of two-dimensional pattern light emitted to an object from a liquid crystal projector is captured by a camera and the distances are measured by triangulation. The distance sensor is not limited to this, but may be any distance sensor, which can output a distance image, such as a distance sensor of other active methods such as an optical cutting method and a time-of-flight method or a distance sensor of a passive method using a stereo camera. In the present embodiment, the same camera is used for the distance sensor and the gray scale image capturing unit 200.

Thereby, it is assumed that a grayscale image and a distance image from the same viewpoint can be obtained. When a camera of the distance sensor is different from a camera of the gray scale image capturing unit 200, the relative positions and orientations of the distance sensor and the gray scale image capturing unit 200 are calibrated in advance. For example, an image of a calibration object whose three-dimensional shape is known is captured, and the relative positions and orientations are obtained from a position and orientation of the object based on the grayscale image and a position and orientation of the object based on the distance image. The distance image measured by the distance measurement unit 300 is inputted into the position and orientation measurement device 100 via the distance image input unit 150.

Next, components included in the position and orientation measurement device 100 will be described.

The three-dimensional shape model storage unit 110 stores a three-dimensional shape model of an object whose position and orientation will be measured. In the present embodiment, the object is described as a three-dimensional shape model including line segments and surfaces.

FIGS. 2A to 2D are schematic diagrams for explaining a three-dimensional shape model of the first embodiment of the present invention. The three-dimensional shape model is defined by a set of points and a set of line segments obtained by connecting the points. As shown in FIG. 2A, a three-dimensional shape model of an object to be measured 10-1 is formed by 14 points P1 to P14. As shown in FIG. 2B, a three-dimensional shape model of an object to be measured 10-2 is formed by 16 line segments L1 to L16. As shown in FIG. 2C, the points P1 to P14 are represented by three-dimensional coordinate values. As shown in FIG. 2D, the line segments L1 to L16 are represented by IDs of points forming the line segments. Further, the three-dimensional shape model holds information of surfaces. Each surface is represented by IDs of points forming the surface. The three-dimensional shape models shown in FIGS. 2A and 2B store information of six surfaces forming a rectangular solid. The three-dimensional shape model is used when the position and orientation calculator 160 calculates a position and orientation of an object.

The approximate position and orientation input unit 120 inputs an approximate value of position and orientation of an object with respect to the position and orientation measurement device 100. In the position and orientation measurement device 100, a three-dimensional coordinate system (reference coordinate system) that is the reference of the position and orientation measurement is defined. The position and orientation of an object with respect to the position and orientation measurement device 100 represents the position and orientation of the object in the reference coordinate system.

In the present embodiment, the reference coordinate system is a coordinate system in which the origin is the center of the camera which is the gray scale image capturing unit 200, the x axis is the horizontal direction of the image, the y axis is the vertical direction of the image, and the z axis is the optical axis of the camera. In the present embodiment, the position and orientation measurement device 100 continuously performs measurement in the time axis direction, and uses previous (previous time) measurement values as the approximate position and orientation. However, the input method of the approximate value of the position and orientation is not limited to this. For example, the amount of change of the position and orientation is estimated on the basis of past measurement results of the position and orientation, and the current position and orientation may be estimated from a past position and orientation and the estimated amount of change. If an approximate position and orientation of the object is known in advance, the values of the approximate position and orientation are used as the approximated values.

The grayscale image input unit 130 performs processing for inputting the grayscale image captured by the gray scale image capturing unit 200 into the position and orientation measurement device 100.

The image feature detector 140 detects image features from the grayscale image inputted from the grayscale image input unit 130. In the present embodiment, edges are detected as the image features.

Specifically, the image feature detector 140 projects the line segments of the three-dimensional shape model onto the image on the basis of the approximate value of the position and orientation of the object inputted from the approximate position and orientation input unit 120 and searches for corresponding edges near the projected line segments.

The distance image input unit 150 performs processing for inputting the distance image obtained by the distance measurement unit 300 into the position and orientation measurement device 100.

The position and orientation calculator 160 measures the position and orientation of the object on the basis of the image features detected by the image feature detector 140, the three-dimensional point group inputted by the distance image input unit 150, and the three-dimensional shape model stored in the three-dimensional shape model storage unit 110.

FIG. 3 is a flowchart showing an example of a procedure of a position and orientation measurement process performed by the position and orientation measurement device according to the first embodiment of the present invention.
Step S1010

The approximate position and orientation input unit 120 inputs an approximate value of the position and orientation of the object with respect to the position and orientation measurement device 100 (camera) into the position and orientation measurement device 100. As described above, in the present invention, the position and orientation measured at a previous time is used as the approximate value.
Step S1020

The grayscale image input unit 130 and the distance image input unit 150 obtain measurement data for calculating the position and orientation of the object. Specifically the grayscale image input unit 130 and the distance image input unit 150 obtain the grayscale image and the distance image of the object to be measured. As described above, three-dimensional coordinates of a point in the reference coordinate system is recorded in each pixel of the distance image. The grayscale image captured by the gray scale image capturing unit 200 is inputted into the position and orientation measurement device 100 via the grayscale image input unit 130. The distance image outputted from the distance measurement unit 300 is inputted into the position and orientation measurement device 100 via the distance image input unit 150.
Step S1030

The image feature detector 140 and the position and orientation calculator 160 measure (calculate) the position and orientation of the object on the basis of information of the grayscale image. In step S1030, the position and orientation of the object is calculated so that the projection images of the line segments in the three-dimensional shape model fit to the edges that are the feature of the gray scale image.

FIG. 4 is a flowchart showing an example of a procedure of the position and orientation measurement (position and orientation calculation) in step S1030 in FIG. 3. Here, the position and orientation is optimized so that the sum of squares of distances between a line segment projected on the image and a line segment based on a position and orientation which is estimated as an edge detected on the image becomes minimum. In the description below, the position and orientation of the object is represented by a six-dimensional vector s. The s includes three elements that represent the position of the object to be measured and three elements that represent the orientation of the object to be measured. The three elements that represent the orientation are represented by, for example, Euler angles, a three dimensional vector whose direction represents a rotation axis passing through the origin and whose norm represents a rotation angle, and the like.

Hereinafter, the procedure of the position and orientation calculation in step S1030 in FIG. 3 will be described.
Step S1110

First, an initialization process is performed in the position and orientation measurement device 100. Here, the approximate position and orientation of the object to be measured, which is obtained in step S1010, is inputted as an approximate value for the position and orientation calculation.
Step S1120

Next, the image feature detector 140 detects image features and associates the image features with the three-dimensional shape model on the grayscale image inputted in step S1020. In the present embodiment, edges are detected as the image features. The edge is a point where the color density gradient is maximum. In the present embodiment, an edge is detected by a method disclosed in Non-Patent Document 1 described above. The edge detection method disclosed in Non-Patent Document 1 is a top-down type method, and a corresponding edge is searched from the model side, so that the detection and the association are performed at the same time.

Figure 5B:
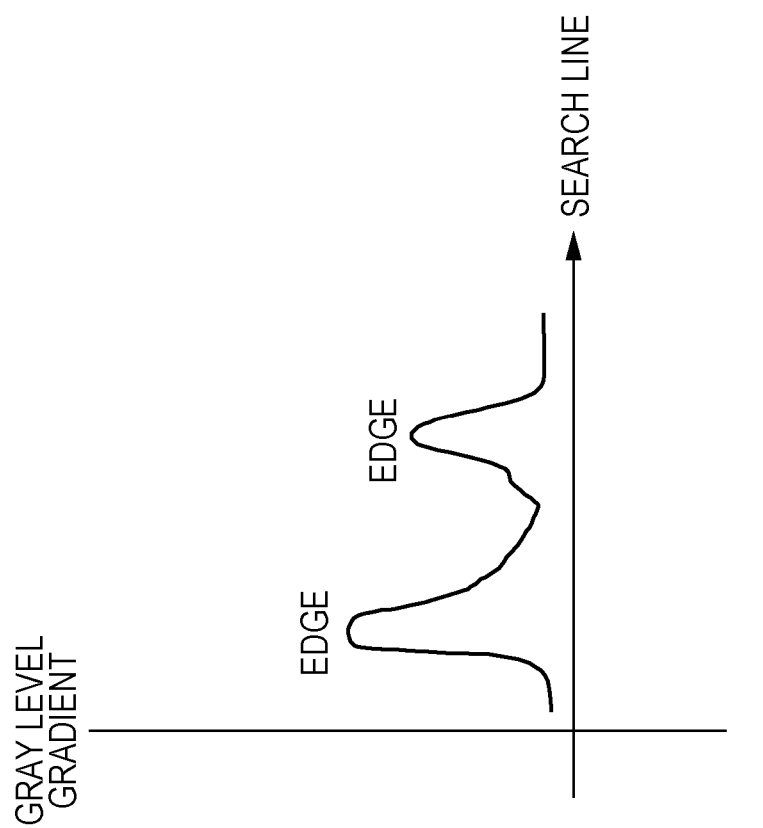
FIGS. 5A and 5B are schematic diagrams for explaining edge detection in the first embodiment of the present invention.
Figure 5A:
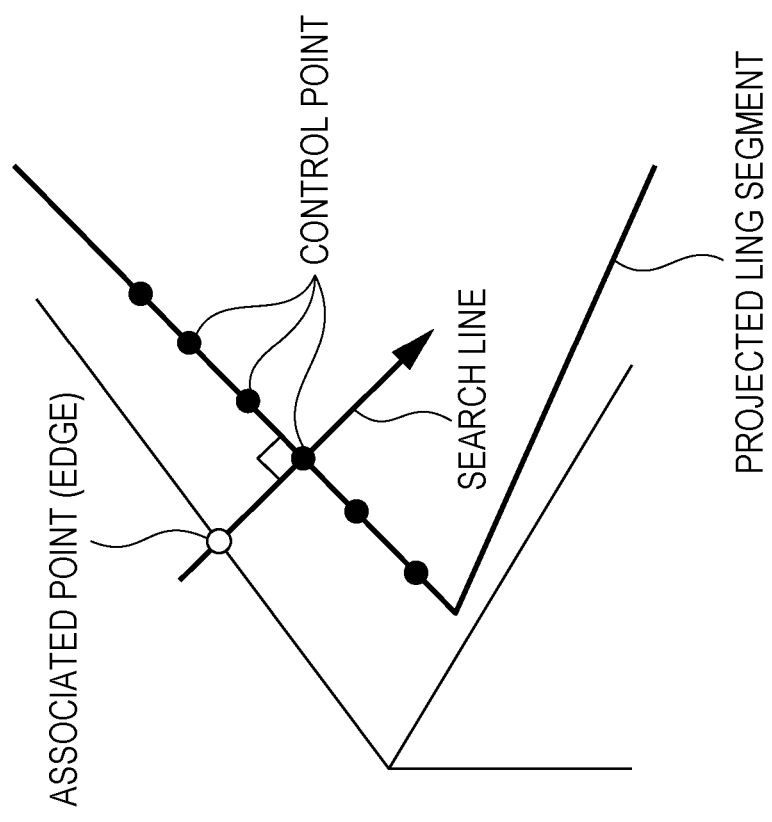

FIGS. 5A and 5B are schematic diagrams for explaining the edge detection in the first embodiment of the present invention. First, here, images of each line segments included in the three-dimensional shape model, which are projected on the image, are calculated by using the approximate value of the position and orientation of the object to be measured which is inputted in step S1110 and the calibrated internal parameters of the camera. The projection image of a line segment is also a line segment on the image. Next, control points are set on the projected line at regular intervals on the image, and one-dimensional edge detection is performed on a line segment which passes through a control point and vertically crosses the projected line (FIG. 5A). The edge is detected as an extreme value of the color density gradient of pixel values, so that, as shown in FIG. 5B, if there is an edge near another edge, a plurality of edges may be detected.

In the present embodiment, among the detected edges, an edge at which the color density gradient is the largest is defined as a corresponding edge.

Step S1130

Next, for example, the position and orientation calculator 160 calculates a coefficient matrix/error vector for calculating the position and orientation on the basis of the association of the control points on the segment lines in the three-dimensional shape model with the edges on the image.

Figure 6:
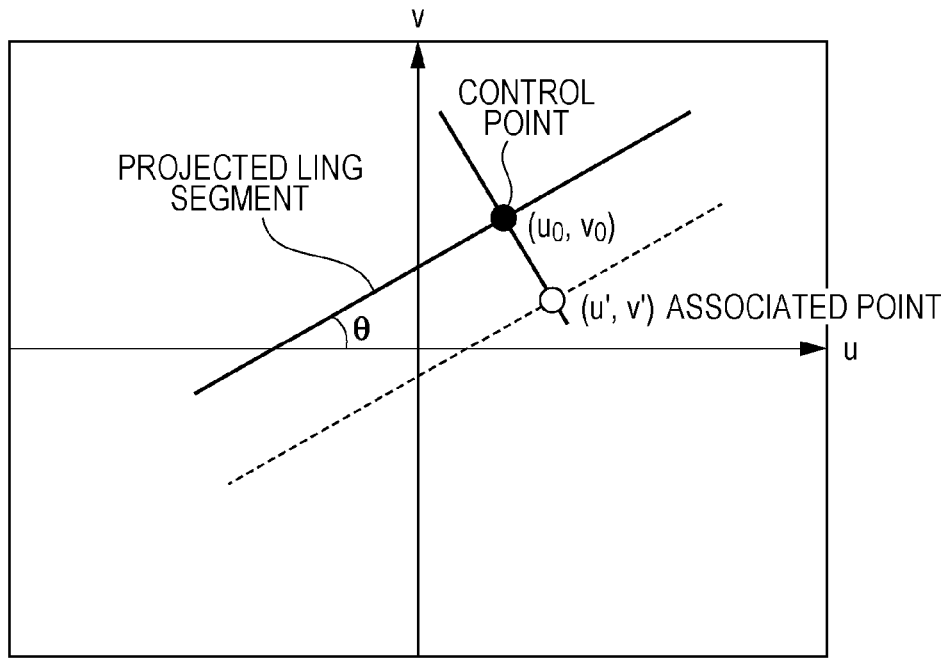
FIG. 6 is a schematic diagram for explaining a relationship between a projected image of a line segment and a detected edge in the first embodiment of the present invention.

FIG. 6 is a schematic diagram for explaining a relationship between a projected image of a line segment and a detected edge in the first embodiment of the present invention.

In FIG. 6, the horizontal direction and the vertical direction are respectively defined as u axis and v axis. A position of a control point on a line segment projected on the image on the basis of an approximate value s0 of the position and orientation is represented by (u0, v0), and an inclination of the line segment to which the control point belongs on the image is represented by an inclination θ with respect to the u axis. The inclination θ is obtained by projecting three-dimensional coordinates of both ends of the line segment on the image on the basis of the approximate value (s0) of s, and calculating the inclination of a line segment connecting the coordinates of both ends on the image. The normal vector of the line segment on the image is (sin θ, −cos θ). The image coordinates of the corresponding point (edge) of the control point is defined as (u', v'). Here, a point (u, v) on a straight line (dashed line in FIG. 6) which passes through the point (u', v') and has an inclination of θ is represented by the formula (1) below (θ is a constant).

$$u \sin \theta - v \cos \theta = d \quad (1)$$

Here, $d = u' \sin \theta - v' \cos \theta$ (constant)

The position of the control point on the image varies depending on the position and orientation of the object to be measured. The image coordinates (u, v) of the control point can be approximated around (u0, v0) by a first order Taylor expansion as described by the formula (2) below. Here, $\Delta s_i$ (i=1, 2, ..., 6) indicates a minor change of each component of s.

$$u \approx u_0 + \sum_{i=1}^{6} \frac{\partial u}{\partial s_i} \Delta s_i \quad (2)$$

$$v \approx v_0 + \sum_{i=1}^{6} \frac{\partial v}{\partial s_i} \Delta s_i$$

If it is assumed that the position of the control point on the image obtained from a correct s is located on a straight line represented by the formula (1), the formula (3) below, which is an observation equation, can be obtained by substituting the formula (2) into the formula (1).

$$\sin\theta \sum_{i=1}^{6} \frac{\partial u}{\partial s_i} \Delta s_i - \cos\theta \sum_{i=1}^{6} \frac{\partial v}{\partial s_i} \Delta s_i = d - r \quad (3)$$

Here, $r = u_0 \sin \theta - v_0 \cos \theta$ (constant)

The observation equation of the formula (3) can be established for all associated control points. The formula (3) is an equation for a minor change $\Delta s_i$ (i=1, 2, ..., 6) of each component of s, and linear simultaneous equations related to $\Delta s_i$ shown by the formula (4) below can be established.

$$\begin{bmatrix} \sin\theta_1 \frac{\partial u}{\partial s_1} - \cos\theta_1 \frac{\partial v}{\partial s_1} & \sin\theta_1 \frac{\partial u}{\partial s_2} - \cos\theta_1 \frac{\partial v}{\partial s_2} & \cdots & \sin\theta_1 \frac{\partial u}{\partial s_6} - \cos\theta_1 \frac{\partial v}{\partial s_6} \\ \sin\theta_2 \frac{\partial u}{\partial s_1} - \cos\theta_1 \frac{\partial v}{\partial s_1} & \sin\theta_2 \frac{\partial u}{\partial s_2} - \cos\theta_1 \frac{\partial v}{\partial s_2} & \cdots & \sin\theta_2 \frac{\partial u}{\partial s_6} - \cos\theta_2 \frac{\partial v}{\partial s_6} \\ \vdots & \vdots & \ddots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \\ \vdots \end{bmatrix} \quad (4)$$

The linear simultaneous equations are represented as the formula (5) below.

$$J \Delta s = E \quad (5)$$

In the formula (5), J of the left-hand member is the coefficient matrix to be obtained and E of the left-hand member is the error vector.

Step S1140

Next, for example, the position and orientation calculator 160 obtains a correction value $\Delta s$ of the potion and orientation by a least square criterion by using a generalized inverse matrix $(J^t \cdot J)^{-1} \cdot J^t$ of the matrix J on the basis of the formula (5). However, when associating the edge, many association errors (outliers) occur, so that a robust estimation method described below is used. Generally, at an outlier edge, a value of the error vector in the right-hand member of the formula (4) is large. Therefore, a small weight is added to data whose absolute value of error is large and a large weight is added to data whose absolute value of error is small, so that influence of data whose error is large is suppressed. For example, the weight is added by a Tukey function as shown by the formula (6) below.

$$w(d-r) = \begin{cases} \left(1 - \left(\frac{d-r}{c_1}\right)^2\right)^2 & |d-r| \leq c_1 \\ 0 & |d-r| > c_1 \end{cases} \quad (6)$$

Here, c1 is a constant in the formula (6). The function for adding a weight is not limited to the Tukey function, but any function can be used which adds a small weight to data whose error is large and adds a large weight to data whose error is small, such as, for example, a Huber function. The weight corresponding to each measurement data is assumed to be wi. Here, a weight matrix W is defined as shown by the formula (7).

$$W = \begin{bmatrix} w_1 & & & 0 \\ & w_2 & & \\ & & \ddots & \\ 0 & & & \end{bmatrix} \quad (7)$$

The weight matrix W is a square matrix with all zeros except for diagonal components, and the diagonal components have weights wi. The formula (5) is changed to the formula (8) below by using the weight matrix W.

$$WJ\Delta s = WE \quad (8)$$

Then, for example, the position and orientation calculator 160 solves the formula (8) as shown by the formula (9), so that the position and orientation calculator 160 obtains the correction value Δs.

$$\Delta s = (J^T W J)^{-1} J^T W E \quad (9)$$

Step S1150

Next, for example, the position and orientation calculator 160 corrects the approximate value of the position and orientation by the correction value Δs of the position and orientation calculated in step S1140.

$$s \leftarrow s + \Delta s$$

Step S1160

Next, for example, the position and orientation calculator 160 determines whether the approximate value converges or not, and if the approximate value converges, the position and orientation calculator 160 ends the process of the flowchart. On the other hand, if the approximate value does not converge, the position and orientation calculator 160 returns to step S1130. The position and orientation calculator 160 determines that the approximate value converges when the correction value Δs is substantially 0 and when the sum of squares of the error vectors hardly changes before and after the correction.

By the above processing, the approximate value of the position and orientation inputted in step S1010 is updated using the information of the grayscale image. As a result, the overlap area between the projection image of the three-dimensional shape model on the image based on the approximate value of the position and orientation and the actual object image is enlarged, so that the number of association errors when associating the distance image with the three-dimensional shape model on the basis of the projection of the three-dimensional shape model is reduced.

Step S1040

Next, a calculation process of the position and orientation using the grayscale image and the distance image will be described. In this step, the image feature detector 140 and the position and orientation calculator 160 estimates (calculates) a position and orientation in which the three-dimensional shape model fits to both the grayscale image and the distance image by using the approximate value of the position and orientation updated in step S1030. Here, the position and orientation is optimized so that a sum of the sum of squares of distances between a line segment projected on the image and a line segment based on a position and orientation which is estimated as an edge on the image and the sum of squares of distances between the three-dimensional point group and the three-dimensional shape model becomes minimum.

Figure 7:
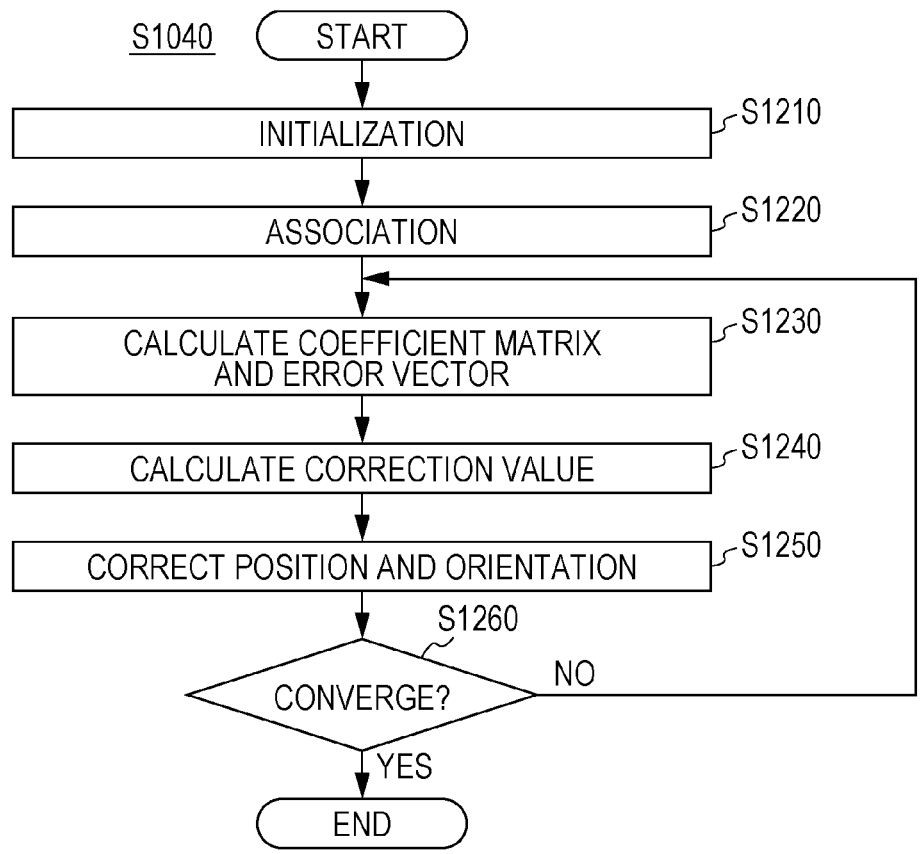
FIG. 7 is a flowchart showing an example of a procedure of a position and orientation calculation in step S1040 in FIG. 3.

FIG. 7 is a flowchart showing an example of a procedure of the position and orientation calculation in step S1040 in FIG. 3. The procedure of this step is substantially the same as that of step S1030 shown in the flowchart of FIG. 4, so that the redundant description will be omitted.

Step S1210

First, an initialization process is performed in the position and orientation measurement device 100. Here, the approximate position and orientation of the object to be measured, which is obtained in step S1030, is inputted as an approximate value for the position and orientation calculation.

Step S1220

Next, the image feature detector 140 detects image features and associates the image features with the three-dimensional shape model on the grayscale image inputted in step S1020. Similarly, the image feature detector 140 associates the distance image inputted in step S1020 with the three-dimensional shape model. The processing performed on the grayscale image is the same as that in step S1120, so that the description will be omitted. Hereinafter, an association process of the distance image with the three-dimensional shape model will be described.

Figure 8:
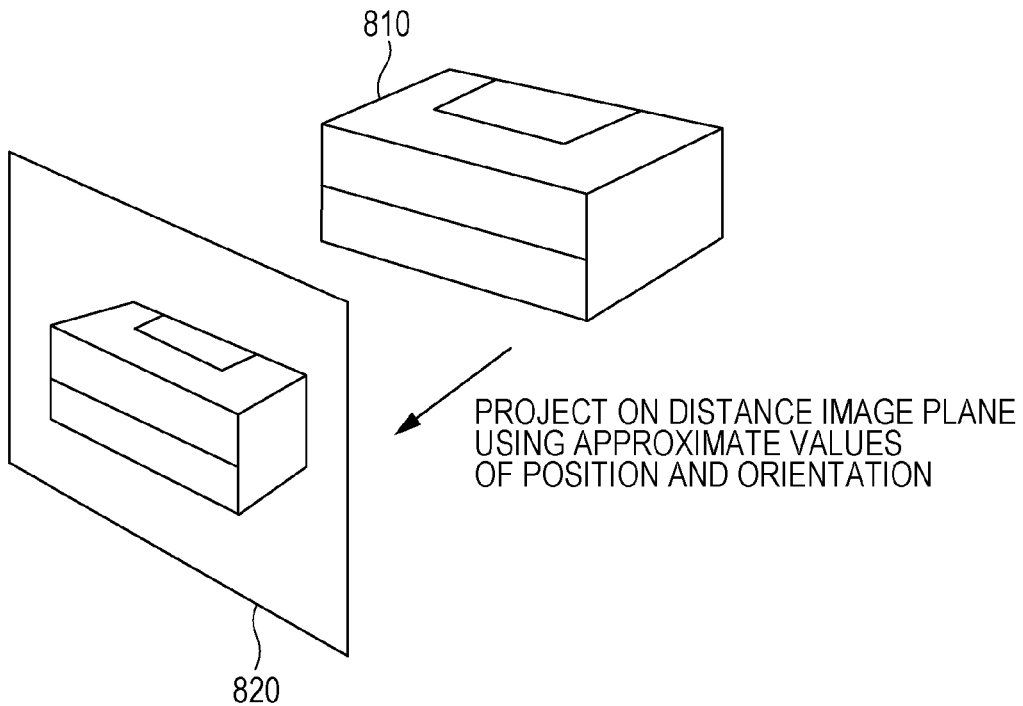
FIG. 8 is a schematic diagram for explaining an association process of a distance image and a three-dimensional shape model in step S1220 in FIG. 7 in the first embodiment of the present invention.

FIG. 8 is a schematic diagram for explaining the association process of the distance image with the three-dimensional shape model in step S1220 in FIG. 7 in the first embodiment of the present invention.

In this step, in the same manner as in a method disclosed in Oishi, Nakazawa, Ikeuchi, "Quick simultaneous position matching of multiple distance images using index image" vol. J89-D, no. 3, pp. 513-521, 2006, association is performed by projecting a three-dimensional model of an object (polygon model) 810 to a distance image plane 820. Here, the reason why the three-dimensional model is projected onto the distance image is to determine which pixel of the distance image is associated with which polygon of the polygon model 810. Here, the polygon model 810 is rendered on an image buffer having the same size as that of the distance image by using the calibrated internal parameters of the camera and the approximate value of the position and orientation. Hereinafter, the image where the polygon model 810 is rendered is referred to as a polygon rendered image.

The polygon model 810 is rendered by assigning an individual color to each polygon. The color of each polygon is represented by RGB color. To distinguish from the background, the polygons are rendered by using colors other than black (R=0, G=0, and B=0). Thereby, polygons associated with each pixel of the distance image can be identified by the color of the image. The rendering of the polygons may be quickly performed on a GPU (Graphics Processing Unit) and the rendered image may be read. After the polygon model 810 is rendered, the values of each pixel of the polygon rendered image are read. A pixel storing a value other than black is associated with a three-dimensional coordinates stored by the pixel of the distance image and a polygon corresponding to the color on the polygon rendered image.

Step S1230

Next, for example, the position and orientation calculator 160 calculates a coefficient matrix/error vector for calculating the position and orientation on the basis of the association of the control points on the segment lines in the three-dimensional shape model with the edges on the image and the association of the polygons with the three-dimensional points. The calculation of the coefficient matrix/error vector based on the association of the control points on the segment lines in the three-dimensional shape model with the edges on the image is the same as that in step S1130, so that the description will be omitted. Hereinafter, the calculation method of the coefficient matrix/error vector based on the association of the pixels (three-dimensional points) of the distance image with surfaces will be described.

An equation of a plane in three-dimensional space is generally represented by ax+by+cz=e(a2+b2+c2=1). Here, an equation of a plane in a coordinate system of an object to be measured in a certain surface of the three-dimensional shape model is assumed to be ax+by+cz=e. The equation of a plane can be converted into an equation of a plane a'x+b'y+c'z=e' in the reference coordinate system on the basis of the approximate value of the position and orientation. The coordinate conversion from the coordinate system of the object to be measured to the reference coordinate system on the basis of the approximate value of the position and orientation is represented by the formula (10) below.

$$X' = Rx + t \quad (10)$$

Here, in the formula (10), R is a 3×3 rotation matrix representing an orientation and t is a three-dimensional vector representing a position. At this time, the coefficients of the equation of a plane in the reference coordinate system are represented by the formula (11) below.

$$\begin{bmatrix} a' \\ b' \\ c' \end{bmatrix} = R \begin{bmatrix} a \\ b \\ c \end{bmatrix}, \; e' = e + \begin{bmatrix} a \\ b \\ c \end{bmatrix}^t R^t t \quad (11)$$

The coordinate conversion of a plane is described in detail in, for example, Kanaya, "Shape CAD and geometry mathematics" (Kyoritsu Shuppan). It is assumed that a point P whose measurement value of the three-dimensional coordinates in the reference coordinate system is (x', y', z') is associated with a surface F in the three-dimensional shape model. A foot of a perpendicular drawn from the point P to the surface F is defined as Q. The three-dimensional coordinates (x, y, z) of the point Q in the reference coordinate system is converted by the position and orientation s of the object to be measured, and can be approximated around three-dimensional coordinates (x0, y0, z0) at a certain position and orientation s by a first order Taylor expansion as described by the formula (12) below.

$$x \approx x_0 + \sum_{i=1}^{6} \frac{\partial x}{\partial s_i} \Delta s_i \quad (12)$$

$$y \approx y_0 + \sum_{i=1}^{6} \frac{\partial y}{\partial s_i} \Delta s_i$$

$$z \approx z_0 + \sum_{i=1}^{6} \frac{\partial z}{\partial s_i} \Delta s_i$$

If it is assumed that (x, y, z) converted by a correct s is located on a plane (a'x+b'y+c'z=e', e'=a'x'+b'y'+c'z') which has the same normal vector as that of the surface F and passes through the point P, the formula (13) below can be obtained by substituting the formula (12) into the equation of the plane.

$$a' \sum_{i=1}^{6} \frac{\partial x}{\partial s_i} \Delta s_i - b' \sum_{i=1}^{6} \frac{\partial y}{\partial s_i} \Delta s_i + c' \sum_{i=1}^{6} \frac{\partial z}{\partial s_i} \Delta s_i = e' - q \quad (13)$$

Here, $q = a'x_0 + b'y_0 + c'z_0$ (constant)

The observation equation of the formula (13) can be established for all associated point group data.

The observation equations of the formula (3) and the formula (13) are equations for a minor change $\Delta s_i$ (i=1, 2, . . . , 6) of each component of s, and the linear simultaneous equations related to $\Delta s_i$ shown by the formula (13) can be established as shown by the formula (14) below.

$$\begin{bmatrix} \sin\theta_1 \frac{\partial u}{\partial s_1} - \cos\theta_1 \frac{\partial v}{\partial s_1} & \sin\theta_1 \frac{\partial u}{\partial s_2} - \cos\theta_1 \frac{\partial v}{\partial s_2} & \cdots & \sin\theta_1 \frac{\partial u}{\partial s_6} - \cos\theta_1 \frac{\partial v}{\partial s_6} \\ \sin\theta_2 \frac{\partial u}{\partial s_1} - \cos\theta_1 \frac{\partial v}{\partial s_1} & \sin\theta_2 \frac{\partial u}{\partial s_2} - \cos\theta_1 \frac{\partial v}{\partial s_2} & \cdots & \sin\theta_2 \frac{\partial u}{\partial s_6} - \cos\theta_2 \frac{\partial v}{\partial s_6} \\ \vdots & \vdots & \ddots & \vdots \\ a'_1 \frac{\partial x}{\partial s_1} + b'_1 \frac{\partial y}{\partial s_1} + c'_1 \frac{\partial z}{\partial s_1} & a'_1 \frac{\partial x}{\partial s_2} + b'_1 \frac{\partial y}{\partial s_2} + c'_1 \frac{\partial z}{\partial s_2} & \cdots & a'_1 \frac{\partial x}{\partial s_6} + b'_1 \frac{\partial y}{\partial s_6} + c'_1 \frac{\partial z}{\partial s_6} \\ a'_2 \frac{\partial x}{\partial s_1} + b'_2 \frac{\partial y}{\partial s_1} + c'_2 \frac{\partial z}{\partial s_1} & a'_2 \frac{\partial x}{\partial s_2} + b'_2 \frac{\partial y}{\partial s_2} + c'_2 \frac{\partial z}{\partial s_2} & \cdots & a'_2 \frac{\partial x}{\partial s_6} + b'_2 \frac{\partial y}{\partial s_6} + c'_2 \frac{\partial z}{\partial s_6} \\ \vdots & \vdots & & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \\ e'_1 - q_1 \\ e'_2 - q_2 \\ \vdots \end{bmatrix} \quad (14)$$

The linear simultaneous equations shown by the formula (14) are represented as the formula (15) below.

$$J\Delta s = E \quad (15)$$

In the formula (15), J of the left-hand member is the coefficient matrix to be obtained and E of the left-hand member is the error vector.

Step S1240

Next, for example, the position and orientation calculator 160 calculates the correction value $\Delta s$ of the position and orientation on the basis of the formula (15). However, it is inevitable that outliers such as association errors are mixed into data associated with the edges and data associated with the distance data. Therefore, by the robust estimation method as described in step S1140, the correction value Δs is calculated by the formula (16) using the weight matrix W.

$$\Delta s = (J^T W J)^{-1} J^T W E \quad (16)$$

Step S1250

Next, for example, the position and orientation calculator 160 corrects the approximate value of the position and orientation by the correction value Δs of the position and orientation calculated in step S1240.

$$s \leftarrow s + \Delta s$$

Step S1260

Next, for example, the position and orientation calculator 160 determines whether the approximate value converges or not, and if the approximate value converges, the position and orientation calculator 160 ends the process of the flowchart. On the other hand, if the approximate value does not converge, the position and orientation calculator 160 returns to step S1230. The position and orientation calculator 160 determines that the approximate value converges when the correction value Δs is substantially 0 and when the sum of squares of the error vectors hardly changes before and after the correction.

As described above, the position and orientation measurement device 100 of the first embodiment has the position and orientation calculator 160 that updates the approximate position and orientation of the object with respect to the position and orientation measurement device 100 so that the three-dimensional shape model fits to the image features of the gray scale image and the distance image.

The position and orientation calculator 160 calculates a first position and orientation so that an overlap area between the object image on the image plane and the projection image of the three-dimensional shape model is the largest possible by using at least information of the grayscale image (step S1030 in FIG. 3). Also, the position and orientation calculator 160 calculates a second position and orientation by associating the three-dimensional shape model with the image features of the gray scale image and the distance image on the basis of the projection image of the three-dimensional shape model projected on the image plane using the first position and orientation (step S1040 in FIG. 3).

In this way, in the first embodiment, the position and orientation of the object is estimated (calculated) using the grayscale image and the approximate value of the position and orientation is updated, and thereafter the distance image is associated with the three-dimensional shape model by projecting the three-dimensional shape model, so that the number of association errors is reduced. As a result, the position and orientation can be estimated (calculated) with a high degree of accuracy by using the grayscale image and the distance image, and the position and orientation measurement device becomes robust against a shift of the approximate value of the position and orientation.

Modified Example 1-1

Reducing the Degree of Freedom in 2D

In the first embodiment described above, in the estimation of the position and orientation using only the grayscale image, which is a pre-stage process, all of the six freedoms of the position and orientation are estimated. However, in this process, not all the freedoms are required to be estimated, and only the components, by which the position and orientation can be estimated with a high degree of accuracy using the grayscale image, may be estimated. When the background and the structure of the object are complicated, it is inevitable that the edges on the grayscale image are mis-associated with the model. When the components to be estimated are limited, over-fitting to the measurement data is mitigated, so that robust property against association error can be expected to be improved. In the present modified example, the first position and orientation is part of components of the position and orientation. Specifically, the first position and orientation is a position perpendicular to the optical axis of the camera of the position and orientation measurement device 100 and an orientation around the optical axis.

In the present modified example, three components of the position components perpendicular to the optical axis of the camera and the orientation components around the optical axis are estimated as unknown parameters. These three parameters are represented by three-dimensional vector s'. The image coordinates (u, v) of the control point can be approximated around (u0, v0) by a first order Taylor expansion as described by the formula (17) below. Here, Δs'i (i=1, 2, and 3) indicates a minor change of each component of s'.

$$u \approx u_0 + \sum_{i=1}^{3} \frac{\partial u}{\partial s_i'} \Delta s_i' \quad (17)$$

$$v \approx v_0 + \sum_{i=1}^{3} \frac{\partial v}{\partial s_i'} \Delta s_i'$$

The formula (18) below, which is an observation equation, can be obtained by substituting the formula (17) into the formula (1).

$$\sin\theta \sum_{i=1}^{3} \frac{\partial u}{\partial s_i'} \Delta s_i' - \cos\theta \sum_{i=1}^{3} \frac{\partial v}{\partial s_i'} \Delta s_i' = d - r \quad (18)$$

The correction value Δs'i (i=1, 2, and 3) is calculated by the same process as that in the first embodiment by using the formula (18) established for all the associated control points as simultaneous equations.

The process in the present modified example is effective when the shape of the projection image based on the approximate position and orientation is similar to the shape of the actual object on the image.

Modified Example 1-2

Association May be Retried in Repetitive Calculations

In the first embodiment described above, in the calculation process of the position and orientation in steps S1030 and S1040, the association information between the measurement data and the three-dimensional shape model is used as fixed information. However, in practice, the association information varies depending on a change of the position and orientation to be estimated. Therefore, the association process may be retried after the position and orientation is updated. However, the association process takes time, so that the association process is not retried every time the position and orientation is updated, but may be retried after the position and orientation is updated several times.

Modified Example 1-3

The Approximate Value May be Obtained by a Closed-Form

In the first embodiment described above, the approximate value of the position and orientation is inputted from a past measurement result. However, the input method of the approximate value of the position and orientation is not limited to this, and the approximate value may be directly calculated on the basis of the information of the grayscale image and the distance image without performing repetitive calculations. In this case, the approximate position and orientation input unit 120 inputs a position and orientation of the object calculated from information of the grayscale image or the distance image by a calculation method that does not require the initial value of the position and orientation as the approximate position and orientation. For example, the position and orientation may be directly calculated by associating line segments detected from the entire image with line segments in the three-dimensional shape model. Specifically, first, edges are detected from the entire image by, for example, Canny's edge detector and edges adjacent to each other are labeled. Next, line segment fitting is performed on edges having the same label by broken line approximation. On the basis of the association of the line segments on the image with the line segments in the three-dimensional shape model obtained in this way, the position and orientation may be calculated by Liu's method according to Y. Liu, T. S. Huang, and O. D. Faugeras, "Determination of camera location from 2-D to 3-D line and point correspondences," Proc. CVPR'88, pp. 82-88, 1988. Also, for example, the position and orientation may be calculated on the basis of the distance image by Johnson's method according to A. Johnson and M. Hebert, "Using spin images for efficient object recognition in cluttered 3D scenes," IEEE Transactions on Pattern Analysis and Machine Intelligence, vol. 21, no. 5, pp. 433-449, 1999.

Modified Example 1-4

The First Position and Orientation is Calculated from Grayscale Image and Distance Image In the first embodiment described above, the position and orientation is estimated using only the grayscale image in a pre-stage process. However, not only the information of the grayscale image, but also the information of the distance image may be used within the extent that the association errors do not exert a bad influence. Specifically, the process of step S1040 is performed instead of the process of step S1030. At this time, a large value is used for a threshold value c1 in the formula (6) to decrease the weight in general so that the association errors of the distance image do not largely affect the calculation of the position and orientation.

Second Embodiment

Obtain Depth Before 2D

In the first embodiment described above, first, the position and orientation of the object is estimated using the grayscale image and the approximate value of the position and orientation is updated, and thereafter the distance image is associated with the three-dimensional shape model by projecting the three-dimensional shape model. However, the update method of the approximate value of the position and orientation is not limited to this. For example, in the position and orientation, a position component corresponding to the depth from the camera may be estimated (calculated) using data of the distance image. If a difference between the approximate value of the position and orientation and the true value is large, it is difficult to correctly associate the distance image with the three-dimensional shape model by projecting the three-dimensional shape model. However, when the distance from the camera to the surface of the object can be assumed to be substantially the same, the depth can be near the true value even if the association is somewhat incorrect.

Therefore, in the present embodiment, first, a position component corresponding to the depth of the object is estimated using the distance image, and thereafter, the process described in the first embodiment is performed. Thereby, even when an approximate value of the position component corresponding to the depth is largely different from the true value, the position and orientation is robustly measured (calculated).

Figure 9:
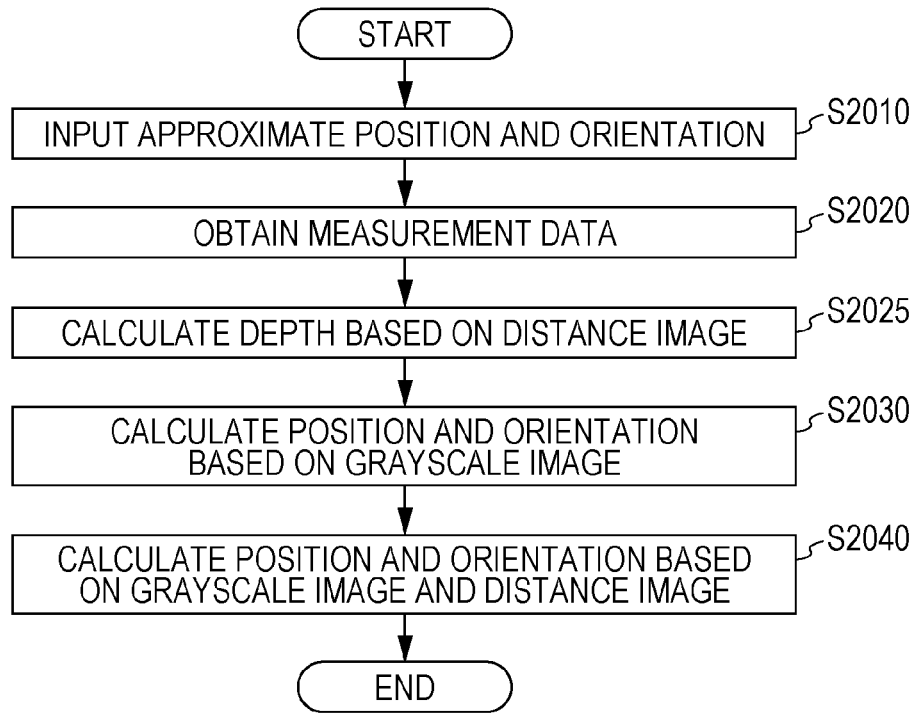
FIG. 9 is a flowchart showing an example of a procedure of a position and orientation measurement process performed by a position and orientation measurement device according to a second embodiment of the present invention.

FIG. 9 is a flowchart showing an example of a procedure of a position and orientation measurement process performed by a position and orientation measurement device according to the second embodiment of the present invention.

Among the steps, steps S2010, S2020, and S2040 are respectively the same as steps S1010, S1020, and S1040 in FIG. 3 of the first embodiment, so that the description thereof will be omitted. Hereinafter, steps S2025 and S2030 in the process of FIG. 9 will be described.

Step S2025

In step S2025, for example, the position and orientation calculator 160 updates the approximate value of the position component corresponding to the depth in the position and orientation of the object on the basis of the information of the distance image.

Specifically, first, the position and orientation calculator 160 associates the distance image with the three-dimensional shape model by the method described in step S1220 of the first embodiment on the basis of the approximate value of the position and orientation inputted in step S2010. Next, for example, the position and orientation calculator 160 updates the position of the object on the basis of the result of the association. The position of the object is updated as described below. Here, the three-dimensional vector representing the approximate value of the position of the object in the reference coordinate system is defined as $t0=[tx\ ty\ tz]t$. Next, for example, the position and orientation calculator 160 calculates three-dimensional coordinates of an intersection point between a light beam which is emitted from the origin of the reference coordinate system (the projection center of the camera) and passes through a pixel on the distance image which is associated with the model surface and the three-dimensional shape model surface. When the direction vector of the light beam is $d=[dx\ dy\ dz]t$, three-dimensional coordinates x of a point on the light beam is represented by $x=\alpha d$ ($\alpha$ is a parameter). When it is assumed that this point is located on the model surface $a'x+b'y+c'z=e'$, $\alpha$ is obtained and x is calculated, so that the three-dimensional coordinates of the intersection point are calculated. The three-dimensional coordinates stored in a pixel on the distance image is defined as xdata and the calculated three-dimensional coordinates of the intersection point is defined as xcalc. The position of the object t0 is updated so that an average value/zcalc of z components of xcalc corresponds to an average value/zdata of z components of xdata. The updated position t' is calculated by the formula (19). The reason why the z component of the position t0 is not simply updated is because the z component differently affects the position depending on an observation direction of the object.

$$t' = \frac{t_z + (\bar{z}_{data} - \bar{z}_{calc})}{t_z} \begin{bmatrix} t_x \\ t_y \\ t_z \end{bmatrix} \quad (19)$$

Step S2030

The image feature detector 140 and the position and orientation calculator 160 measure (calculate) the position and orientation of the object on the basis of information of the grayscale image. Although the basic process is the same as that in step S1030 of the first embodiment, the approximate value of the position and orientation inputted in step S2025 is used as the inputted approximate value of the position and orientation. The description of the process after that will be omitted.

In this way, in the second embodiment, a position component corresponding to the depth of the object is estimated using the distance image, and thereafter, the process described in the first embodiment is performed. Thereby, a shift of the approximate value of the position component corresponding to the depth is corrected, so that the number of association errors can be reduced in the process thereafter.

Modified Example 2-1

Edge May be a Feature Point

In the embodiments and the modified examples of the present invention, the feature of the grayscale image is edges and the position and orientation is measured by fitting line segments in the three-dimensional shape model to the edges. However, the feature of the grayscale image is not limited to edges, but, for example, may be feature points that are two-dimensional features. The feature point is a characteristic point on an image such as a corner point. For example, the feature point can be detected by Harris's detector according to C. Harris and M. Stephens, "A combined corner and edge detector" Proc. the 4th Alvey Vision Conference, pp. 147-151, 1988. When the three-dimensional shape model is represented by a three-dimensional point group, each feature point can be associated with a point in the three-dimensional point group in the model. When the feature points are used, first, the feature points are detected from the entire image by the Harris's detector. Next, each point in the three-dimensional point group in the model is projected on the image on the basis of the approximate value of the position and orientation, and associated with a nearest feature point on the image.

Other Embodiments

The present invention can be implemented by performing the process described below. Specifically, in the process, software (program) that realizes functions of the embodiments described above is provided to a system or a device via a network or various storage media, and a computer (CPU or MPU) of the system or the device reads and executes the program.

The program and a computer-readable storage medium storing the program are included in the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-278270 filed Dec. 14, 2010, which is hereby incorporated by reference herein in its entirety.

What is claimed is:

1. A position and orientation measurement device that measures a position and orientation of an object to be measured, the device comprising:
a processor; and
a memory containing instructions that, when executed by the processor, perfom operations as:
a storage unit configured to store a three-dimensional shape model of the object;
a two-dimensional image input unit configured to input a two-dimensional image representing the object;
a distance image input unit configured to input a distance image sensed by a distance sensor, which indicates a distance from the distance sensor to the object;
an approximate position and orientation input unit configured to input an approximate position and orientation of the object; and
a position and orientation calculation unit configured to calculate, a first position and orientation of the object by associating the three-dimensional shape model with the two-dimensional image based on the approximate position and orientation of the object and thereafter calculate a second position and orientation of the object by associating the three-dimensional shape model with both the two-dimensional image and the distance image based on the first position and orientation.

2. The position and orientation measurement device according to claim 1, wherein the position and orientation calculation unit calculates the first position and orientation of the object by updating a component in six freedoms representing an approximate position and orientation based on the two-dimensional image.

3. The position and orientation measurement device according to claim 2, wherein the component includes a position perpendicular to an optical axis of a camera of the position and orientation measurement device and an orientation around the optical axis.

4. The position and orientation measurement device according to claim 1, wherein the approximate position and orientation input unit inputs a position and orientation of the object obtained from information of at least one of the two-dimensional image and the distance image by a calculation method that does not require an initial value of the position and orientation as an approximate position and orientation.

5. The position and orientation measurement device according to claim 1, wherein the position and orientation calculation unit calculates a position corresponding to a distance from the position and orientation measurement device in the position and orientation by using information of the distance image before deriving the first position and orientation.

6. The position and orientation measurement device according to claim 1, wherein image features in the two-dimensional image used in measuring the position and orientation of the object are edges.

7. The position and orientation measurement device according to claim 1, wherein image features in the two-dimensional image used in measuring the position and orientation of the object are feature points.

8. A position and orientation measurement method by a position and orientation measurement device that measures position and orientation of an object to be measured, the method comprising:
- a storage step for storing a three-dimensional shape model of the object;
- a two-dimensional image input step for inputting a two-dimensional image representing the object;
- a distance image input step for inputting a distance image sensed by a distance sensor, which indicates a distance from the distance sensor to the object;
- an approximate position and orientation input step for inputting an approximate position and orientation of the object;
- a position and orientation calculation step for calculating, without using the distance image, a first position and orientation of the object by associating the three-dimensional shape model with the two-dimensional image based on the approximate position and orientation of the object and for thereafter calculating a second position and orientation of the object by associating the three-dimensional shape model with both the two-dimensional image of the object and the distance image based on the first position and orientation.

9. The device according to claim 1, further comprising:
- a two-dimensional image capturing unit configured to sense a two-dimensional image of the object.

10. The device according to claim 1, further comprising:
the distance sensor which senses the distance image.

11. A non-transitory storage medium having instructions that, when executed by a processor, cause the processor to perform operations comprising:
- storing a three-dimensional shape model of the object;
- inputting a two-dimensional image representing of the object;
- inputting a distance image sensed by a distance sensor, which indicates a distance from the distance sensor to the object;
- inputting an approximate position and orientation of the object;
- calculating, without using the distance image, a first position and orientation of the object by associating the three-dimensional shape model with the two-dimensional image based on the approximate position and orientation of the object, and
- calculating a second position and orientation of the object by associating the three-dimensional shape model with both the two-dimensional image and the distance image based on the first position and orientation.

12. The position and orientation measurement device according to claim 1, wherein the position and orientation calculation unit calculates the first position and orientation of the object by associating the three-dimensional shape model with a feature of the two-dimensional image of the object using the approximate position and orientation of the object and derives a second position and orientation of the object by associating the three-dimensional shape model with a feature of the two-dimensional image of the object and a feature of the distance image of the object using the first position and orientation.

* * * * *